United States Patent Office 2,920,260
Patented Jan. 5, 1960

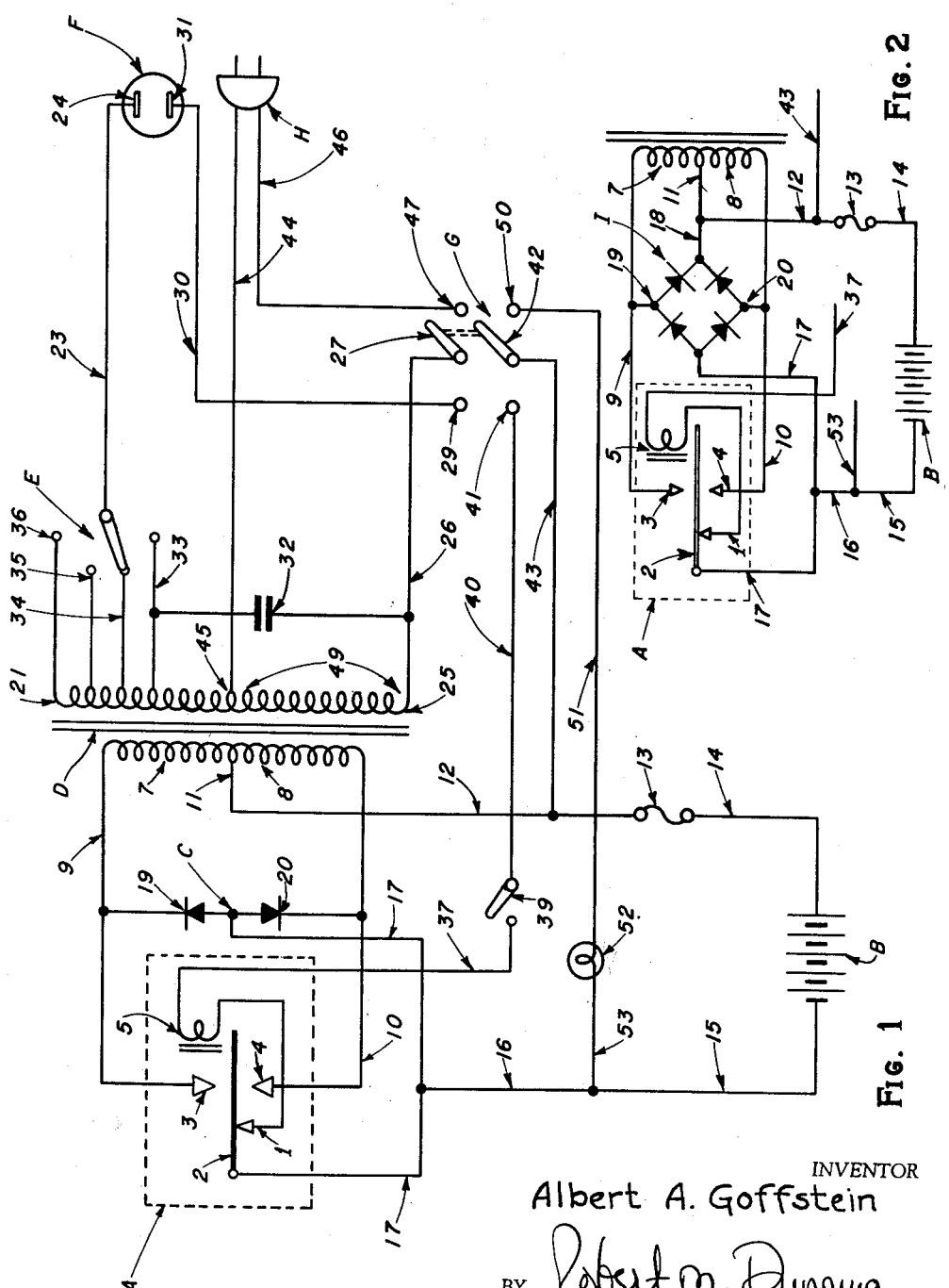
Jan. 5, 1960     A. A. GOFFSTEIN     2,920,260
BATTERY CHARGER AND POWER INVERTER SYSTEM
Filed Nov. 10, 1953
INVENTOR
Albert A. Goffstein
BY Robert M. Dunning
ATTORNEY

2,920,260

BATTERY CHARGER AND POWER INVERTER SYSTEM

Albert A. Goffstein, St. Paul, Minn., assignor to American Television & Radio Co., Ramsey County, Minn., a corporation of Minnesota Application November 10, 1953, Serial No. 391,335

12 Claims. (Cl. 321—8)

This invention relates to an improvement in battery charger and power inverter system, and deals particularly with a device capable of charging a battery from a source of alternating current and also capable of inverting the battery current so that alternating current consuming devices can be used therewith.

In recent years the use of an automobile battery as a source of power for dictating machines, electric razors, recorders and the like has become increasingly popular. The use of battery current for operating automobile heating systems, defrosting systems, radios, seat controls and window controls has also increased, thereby placing a greater strain upon these batteries. The present device is designed to permit the battery to be conveniently charged when the car is near a source of supply of alternating current. Conversely, it permits alternating current consuming devices to be operated from battery current when other alternating current supplies are not available.

An important feature of the present invention lies in the provision of an apparatus of the class described which is safe to use and which cannot accidentally cause injury to the user. The charging circuit and the inverter circuit are controlled by a simple switching device which isolates either the alternating current input plug or the alternating current outlet of the inverter circuit. As a result, the chance of injury to the user is eliminated or materially reduced.

An object of the present invention lies in providing a battery charging and power inverter system having a single transformer utilized in both a charging circuit for a battery and a power output circuit from the battery. This system comprises, exclusive of the battery, a transformer having a high tension winding and low tension winding, a rectifier, and a charging circuit for said battery including said low tension winding and said rectifier permanently connected together. The system also includes a vibrator, a power output circuit, including a buffer, from said battery including said low tension winding and said vibrator, all permanently connected together. The system also incorporates a means for selectively closing said charging circuit and said power output circuit, and a circuit for said high tension winding or portion thereof adapted to be selectively connected to an alternating current source or an alternating current load with voltages properly removed to prevent shocks and to provide safe operation.

One of the objects of the invention is to provide a rectifier permanently connected to the low tension winding and associated vibrator power contacts. A further object of the invention is to provide a means for selectively switching from charging circuit to inverter circuit whereby, when inverter circuit is operating, no high voltage appears at the charging circuit A.C. input plug and likewise, when the charging circuit is operating, no A.C. voltage will appear at the inverter A.C. receptacle.

Further objects and advantages of the invention will appear more fully hereafter in the accompanying specification and claims.

In the drawings forming a part of the specification:

Figure 1 is a diagrammatic view of the circuit arrangement embodying the principles of my invention.

Figure 2 is a diagrammatic view of a modification of the system of Figure 1.

Referring to the circuit illustrated in the figure 1, I provide a vibrator interrupter which is indicated in general by the letter A. This interrupter A includes a reed 2 which is provided with suitable contacts thereon adapted to vibrate between oppositely disposed contacts 3 and 4. The reed 2 is driven by an electromagnet 5 which is in series with driving contacts 1.

Co-operating with the vibrator interrupter is a transformer which is indicated in general by the letter D. This transformer is provided with low tension windings provided with a pair of connected coil sections 7 and 8. While the coil sections 7 and 8 are shown as having terminal connections on opposite sides of a center tap, each coil section may have intermediate taps or extensions on the winding for the purpose of providing lesser or greater alternating current voltage to the rectifier which is indicated in general by the letter C. One terminal of the coil 7 is connected by the conductor 9 to the stationary vibrator contact 3. One terminal of the coil section 8 is connected by conductor 10 to the stationary vibrator contact 4. In effect, the coil sections provide a low tension winding having a center tap 11.

The center tap 11 is connected by a conductor 12 to the fuse 13 which in turn is connected by conductor 14 to one side of the battery B. The other terminal of the battery B is connected by conductors 15, 16 and 17 to the reed 2 of the vibrator which is defined by the dotted outline A. This completes the primary low tension power circuit.

The rectifier C consists of rectifier sections having terminals 19 and 20 which are respectively connected to the stationary contacts 3 and 4 of the vibrator. These connections are either direct or through taps or extensions of the low tension windings 7 and 8 to provide suitable arc suppression circuit across the stationary contacts 3 and 4. In addition the rectifier sections, having terminals 19 and 20, are permanently connected across the low tension transformer winding, either directly or through taps or extensions of said winding, and the associated vibrator contacts 3 and 4 attached to provide a charging circuit to the battery.

In addition to the center tapped rectifier circuit as illustrated in Figure 1, it is readily apparent that a full wave bridge rectifier circuit as shown in Figure 2 may be easily substituted. In the arrangement of Figure 2, the rectifier I is connected to the low tension windings 7 and 8 at terminals 19 and 20. One rectifier output terminal is connected by conductors 17, 16 and 15 to one terminal of the battery B and through conductor 17 leading to reed 2. The other rectifier output terminal is connected by conductor 18 to the center tap 11 of the low tension coil, and through conductor 12, fuse 13, and conductor 14 to the other side of the battery.

Figure 2 merely shows the manner in which the full wave rectifier may be used in place of rectifiers of other types. For simplicity of explanation, similar numbers are used for similar parts.

The high tension winding 21 of transformer D is adapted to deliver an alternating current to the load through the output socket or receptacle F. To this end one terminal of the secondary winding 21 is connected through a selector switch E, the arm of which is connected by conductor 23 to one terminal 24 of the output receptacle F. The other terminal 25 of the high tension winding 21 is connected through conductor 26 to the switch arm 27 which may be pivoted into contact with the terminal 29 of the switch G. Terminal 29 is connected by conductor 30 to the second terminal 31 of the output receptacle F. A buffer condenser 32 is connected between the conductor 26 and a tap 33 of the selector switch E. The selector switch E is selectively connectable to any of a series of taps 33, 34, 35 and 36 to provide a suitable alternating current voltage to the load connected to the output receptacle F.

The vibrating reed 2 is connected to battery B through conductors 17, 16 and 15. The contact 1 on the vibrator is connected through the series driving coil 5, conductor 37, switch 39, and conductor 40, to contact 41 of switch G. An arm 42 of switch G which rotates in unison with the arm 27 is engageable with terminal 41 and is connected through conductor 43 to fuse 13 which is connected through conductor 14 to the second terminal of the battery B. The closing of switch 39 provides power to the series driving coil 5 to actuate the vibrator interrupter reed 2.

A plug H is provided which is arranged for connection through an extension cord to a source of supply of alternating current. One terminal of the plug H is connected through conductor 44 to a tap 45 on the high tension secondary winding 21. The other terminal of the plug H is connected by conductor 46 to a terminal 47 of the switch G which is selectively engageable with the switch arm 27. When the arm 27 is in contact with the terminal 47 and a source of alternating current supply is provided for the plug H, a circuit is closed through the portion 49 of the high tension coil 21 between the tap 45 and the coil terminal 25 through the conductor 26, switch arm 27, terminal 47, and conductor 46. This allows the high tension coil 49 to be energized. The pair of coil sections 7 and 8, including suitable taps or winding extensions with center tap 9 are a low tension winding to provide alternating current voltage to rectifier C at terminals 19 and 20 and the rectified current flows through conductor 17 through conductors 16 and 15 to battery B. The other terminal of the battery is connected through conductor 14, fuse 13, and conductor 12 to the tap 11 of the low tension winding. The center tap 11 is also connected through conductor 43 to the switch arm 42 which is now in contact with switch terminal 50. Switch terminal 50 is connected by conductor 51 to pilot lamp 52, the second terminal of which is connected by conductor 53 to the conductors 15 and 16. Thus, opposite terminals of the battery B are connected through the switch G to the pilot lamp 52 to give indication that the switch G is in proper position for battery charger use.

The pilot light will glow dimly with a battery in a low state of charge when no alternating current voltage is applied to the input plug H. This light 52 will grow brighter when alternating voltage is applied to plug H, causing the battery B to be charged through the rectifier circuit which has been described.

The apparatus may be used as an inverter by swinging the switch arms 27 and 42 into contact with the cooperable terminals 29 and 41, respectively. When the switch G is operated in this manner safe and shock proof operation is insured because one terminal of the plug H is entirely disconnected from any circuit. During this period of operation the battery B acts through the vibrator circuit and the transformer D to produce the necessary alternating current to the output receptacle F.

When the battery charging circuit is in use, the plug H is connected in the circuit but one terminal of the output receptacle F is entirely disconnected from any circuit by the switch G.

In summary, it will be seen that my device employs a single transformer with low tension coils connected to the stationary contacts of a vibrator and said low tension coils also connected to opposed rectifier sections. The battery is connected between a center tap of the low tension coils and the vibrator reed which is also connected between the opposed rectifiers. When a source of alternating current is desired using the battery as a current supply, the vibrator reed produces alternately oppositely directed current flow in the low tension windings to produce a relatively high voltage alternating current output. When at least a portion of the high tension coil is connected to a source of high voltage alternating current, the opposed rectifiers form a full wave rectifier connected to opposite terminals of the battery for battery charging purposes. The switch arrangement is such that high voltage current never appears at the input plug during generation of alternating current from the battery and the circuit to the output receptacle is broken during battery charging operations.

In accordance with the patent statutes, I have described the principles of construction and operation of my battery charger and power inverter system, and while I have endeavored to set forth the best embodiment thereof, I desire to have it understood that obvious changes may be made within the scope of the following claims without departing from the spirit of my invention.

I claim:

1. A combination battery charger and power inverter including a single transformer having low tension windings, a vibrator having an electromagnet and vibrator stationary contacts connected to said low tension windings, rectifiers permanently connected in parallel with said low tension windings, said transformer having a high tension winding connected in series with an output receptacle, said vibrator including a reed permanently connected between said stationary contacts and battery connections to said reed and to said low tension windings, respectively, an alternating current input, double throw switch means for connecting said alternating input to said high tension transformer winding in one position and said electromagnet to said battery connections in the other position, whereby the battery may supply alternating current to said output receptacle or said input may supply rectified charging current to said battery.

2. A combination battery charger and power inverter system including a single transformer, said transformer having a low tension winding having a center tap and outer terminals, a vibrator having stationary contacts connected to said outer winding terminals, rectifier sections permanently connected having a common rectified current terminal and opposite terminals connected to said outer terminals of said windings, a battery terminal connected to the reed of said vibrator and to the common rectifier terminal, a second battery terminal connected to the center tap of said low tension winding, said transformer having a high tension winding, an A.-C. output receptacle adapted to be connected in series with at least a portion of said high tension winding, an A.-C. input adapted to be connected in series with at least a portion of said high tension winding, and double throw switch means for connecting either said A.-C. output or said A.-C. input to said high tension winding, whereby vibrator battery current through said low tension coils may produce alternating current in said output receptacle and alternating current applied at said input may produce a rectified battery charging current.

3. The structure described in claim 2 and including a series of taps on said high tension coil to which said output receptacle may be selectively connected.

4. The construction described in claim 2 and including a pilot lamp connected in parallel with said battery when alternating current is applied at said input.

5. The construction described in claim 2 and including a driving coil for actuating said vibrator connected across said battery terminals.

6. A combination battery charger and power inverter including a transformer having a low tension winding and a high tension winding, said low tension winding having outer terminals and a center tap, a vibrator including a reed and vibrator contacts with which said reed is selectively engageable, means connecting each vibrator contact with a corresponding outer terminal of said low tension winding, a pair of opposed rectifier sections having a common terminal for rectified current connected to said reed and input terminals each connected to a corresponding outer terminal of said low tension winding, a battery terminal permanently connected to said center tap, a second battery terminal permanently connected to said reed and to said common rectifier terminal, an output receptacle connected in series with at least a portion of said high tension winding, and an input member connected in series with at least a portion of said high tension winding, a selector switch connecting either said output receptacle or said input to said high tension winding, a driving coil for said vibrator reed having one terminal connected to a reed contact and having a second terminal connected to a terminal of said selector switch, a pilot light, said selector switch selectively connecting either said driving coil or said pilot light across said battery terminals.

7. The construction described in claim 6 and including a second switch connected in series with said driving coil.

8. A combination battery charger and power inverter system including a single transformer, said transformer including a low tension winding having a center tap and outer terminals, a vibrator having stationary contacts connected to said respective outer winding terminals, a full-wave bridge rectifier having alternating current terminals connected to said outer terminals of said low tension winding, and direct current output terminals, means connecting one direct current output terminal to the reed and to one terminal of the storage battery and means connecting the other direct current output terminal to the second battery terminal and to the center tap of said low tension winding, said transformer having a high tension winding, an A.-C. output receptacle adapted to be connected in series with at least a portion of said high tension winding, an A.-C. input adapted to be connected in series with at least a portion of said high tension winding, and switch means for connecting either said A.-C. output receptacle to said high tension winding or said A.-C. input thereto, whereby vibrator battery current through said low tension coils may produce alternating current in said output receptacle and alternating current applied at said input may produce a rectified battery charging current.

9. The structure described in claim 8 and including a series of taps on said high tension coil to which said output receptacle may be selectively connected.

10. The construction described in claim 8 and including a pilot lamp connected in parallel with said battery when alternating current is applied at said input.

11. The construction described in claim 8 and including a driving coil for actuating said vibrator connected across said battery terminals.

12. A combination battery charger and power inverter including a single transformer having low tension windings, a vibrator having a reed, and including stationary contacts between which said reed vibrates, means permanently connecting each stationary contact with a corresponding low tension winding, a rectifier means, means permanently connecting each rectifier input terminal to a corresponding low tension winding, a battery, means permanently connecting said reed to a rectifier output terminal and to one side of said battery, means permanently connecting the other side of said battery to said low tension windings, said transformer including a high tension winding, an alternating current output receptacle adapted to be connected in series with at least a portion of said high tension winding, an alternating current input adapted to be connected in series with at least a portion of said high tension coil, and switch means for selectively connecting either said output or input to said high tension winding, whereby the battery may supply alternating current to said output receptacle, or said input may supply rectified charging current to said battery.

References Cited in the file of this patent

UNITED STATES PATENTS

| | | |
|---|---|---|
| 383,620 | Byllesby | May 29, 1888 |
| 404,139 | Westinghouse | May 28, 1889 |
| 1,097,742 | Wade et al. | May 26, 1914 |
| 2,066,995 | Morack | Jan. 5, 1937 |
| 2,343,411 | Grandstaff et al. | Mar. 7, 1944 |
| 2,423,646 | Flippen et al. | July 8, 1947 |
| 2,505,185 | Housman | Apr. 25, 1950 |
| 2,555,630 | Bishner | June 5, 1951 |